US012134753B2

(12) United States Patent
Berardinelli (10) Patent No.: US 12,134,753 B2
(45) Date of Patent: Nov. 5, 2024

(54) ALCOHOL AGING ASSEMBLY

(71) Applicant: Elio Berardinelli, Vancouver, WA (US)

(72) Inventor: Elio Berardinelli, Vancouver, WA (US)

( * ) Notice: Subject to any disclaimer, the term of this patent is extended or adjusted under 35 U.S.C. 154(b) by 645 days.

(21) Appl. No.: 17/507,405

(22) Filed: Oct. 21, 2021

(65) Prior Publication Data

US 2023/0128549 A1     Apr. 27, 2023

(51) Int. Cl.
| | |
|---|---|
| *C12G 3/07* | (2006.01) |
| *B01F 23/236* | (2022.01) |
| *B01F 23/237* | (2022.01) |
| *B01F 101/16* | (2022.01) |
| *C12H 1/16* | (2006.01) |
| *C12H 1/22* | (2006.01) |

(52) U.S. Cl.
CPC .......... *C12G 3/07* (2019.02); *B01F 23/2362* (2022.01); *C12H 1/165* (2013.01); *C12H 1/22* (2013.01); *B01F 23/237611* (2022.01); *B01F 2101/16* (2022.01)

(58) Field of Classification Search
CPC ............ B01F 2101/16; B01F 23/2362; B01F 23/237611; C12G 3/07; C12H 1/165; C12H 1/22
USPC ......................................................... 99/277
See application file for complete search history.

(56) References Cited

U.S. PATENT DOCUMENTS

| | | | |
|---|---|---|---|
| 2,044,898 A | 6/1936 | Carrell | |
| D749,292 S | 2/2016 | Peniche | |
| 9,745,545 B2 * | 8/2017 | Niazi | C12G 3/07 |
| 10,633,620 B2 | 4/2020 | DeCaro | |
| 10,889,787 B2 | 1/2021 | Fearnside | |
| 2009/0291175 A1 | 11/2009 | Wei | |
| 2015/0307425 A1* | 10/2015 | Cox | B65B 3/04 |
| | | | 165/47 |
| 2016/0129407 A1* | 5/2016 | Wrosch | B01F 35/2142 |
| | | | 366/108 |
| 2017/0335262 A1* | 11/2017 | Blair | C12G 3/07 |

FOREIGN PATENT DOCUMENTS

WO     WO2020167963     8/2020

OTHER PUBLICATIONS

Shi, CN112111364A (Year: 2020).*
JPH01174304U (Year: 1989).*

* cited by examiner

*Primary Examiner* — Vy T Nguyen (57) ABSTRACT

An alcohol aging assembly for rapidly aging distilled spirits includes an aging container for containing alcohol. A cylinder comprised of copper is provided which can be submerged in alcohol without imparting an unpleasant flavor to the alcohol. A plurality of dowels is each of the dowels is disposed within the cylinder and each of the dowels is comprised of oak to facilitate a chemical process to enhance the flavor and color of the alcohol. A light emitter is disposed inside of the cylinder to emit light into the alcohol when the cylinder is submerged into the alcohol. The light emitter emits light in the ultra-violet spectrum to increase the rate of chemical reaction between the alcohol and the dowels thereby speeding up the process of aging the alcohol.

11 Claims, 5 Drawing Sheets

ALCOHOL AGING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to aging devices and more particularly pertains to a new aging device for rapidly aging distilled spirits. The device includes an aging container for containing a distilled spirit and a copper cylinder that is submergible in the alcohol. The device includes a plurality of oak dowels that are disposed in the cylinder for imparting desirable flavors into the distilled spirits. A light emitter which emits ultra-violet light is positioned in the cylinder. The light emitter speeds up the aging process of the distilled spirits.

(2) Description of Related Art Including Information Disclosed Under 37 CFR 1.97 and 1.98

The prior art relates to aging devices including a variety of aging devices that employ various novel means for imparting thermal energy into distilled spirits during the aging process to speed up the aging process of the distilled spirits. The prior art discloses a variety of aging devices that employ various means of maximizing the effect of wood submerged in distilled spirits to speed up the aging process of the distilled spirits. The prior art discloses a method of aging distilled spirits which includes chemically treating wood chips that are submerged in the distilled spirits for speeding up the aging process of the distilled spirits. The prior art discloses an aging device that employs ultrasonic sound to speed up the aging process of distilled spirits.

BRIEF SUMMARY OF THE INVENTION

An embodiment of the disclosure meets the needs presented above by generally comprising an aging container for containing alcohol. A cylinder comprised of copper is provided which can be submerged in alcohol without imparting an unpleasant flavor to the alcohol. A plurality of dowels is each of the dowels is disposed within the cylinder and each of the dowels is comprised of oak to facilitate a chemical process to enhance the flavor and color of the alcohol. A light emitter is disposed inside of the cylinder to emit light into the alcohol when the cylinder is submerged into the alcohol. The light emitter emits light in the ultra-violet spectrum to increase the rate of chemical reaction between the alcohol and the dowels thereby speeding up the process of aging the alcohol.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
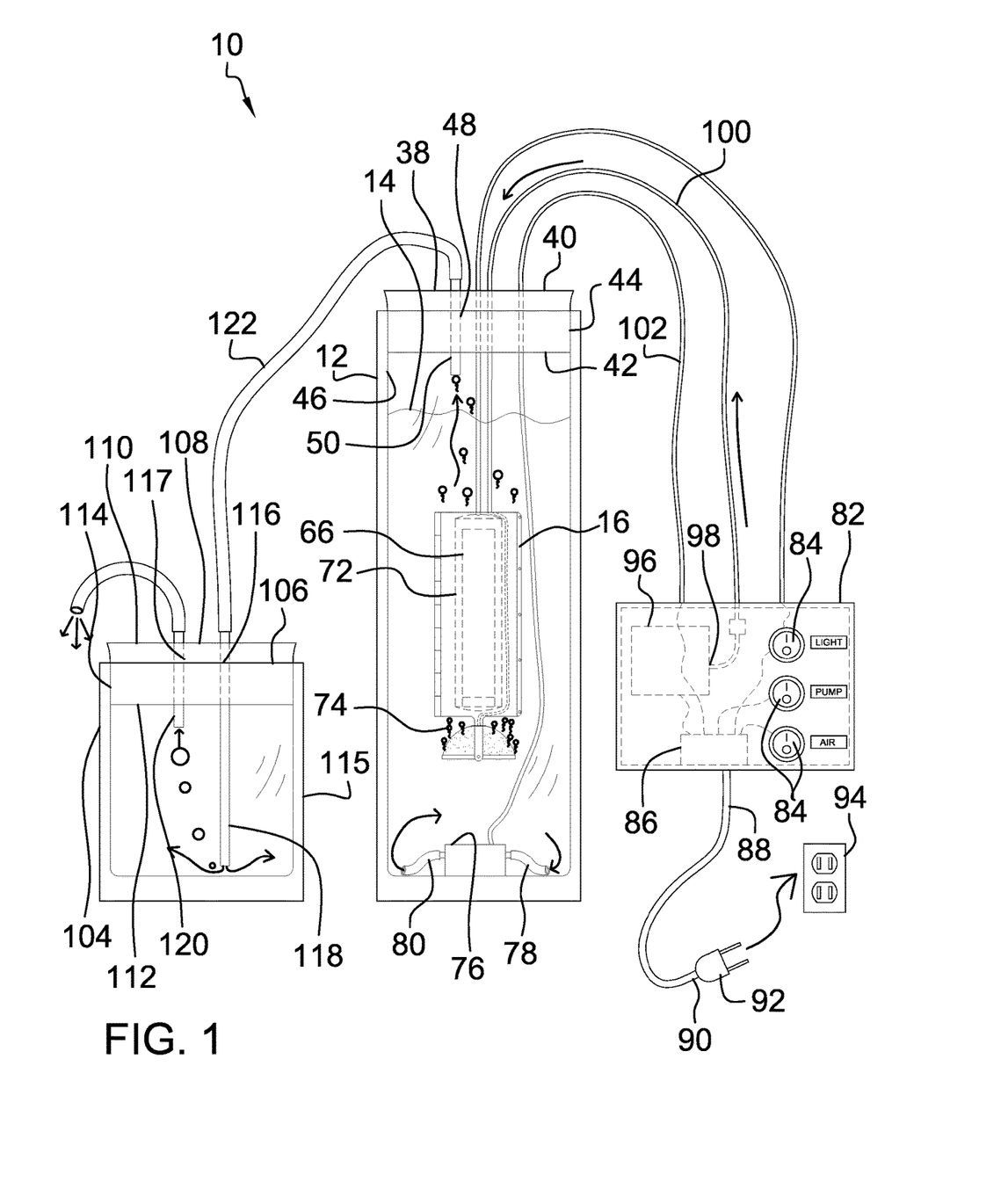
FIG. 1 is a phantom in-use view of an alcohol aging assembly according to an embodiment of the disclosure.
Figure 2:
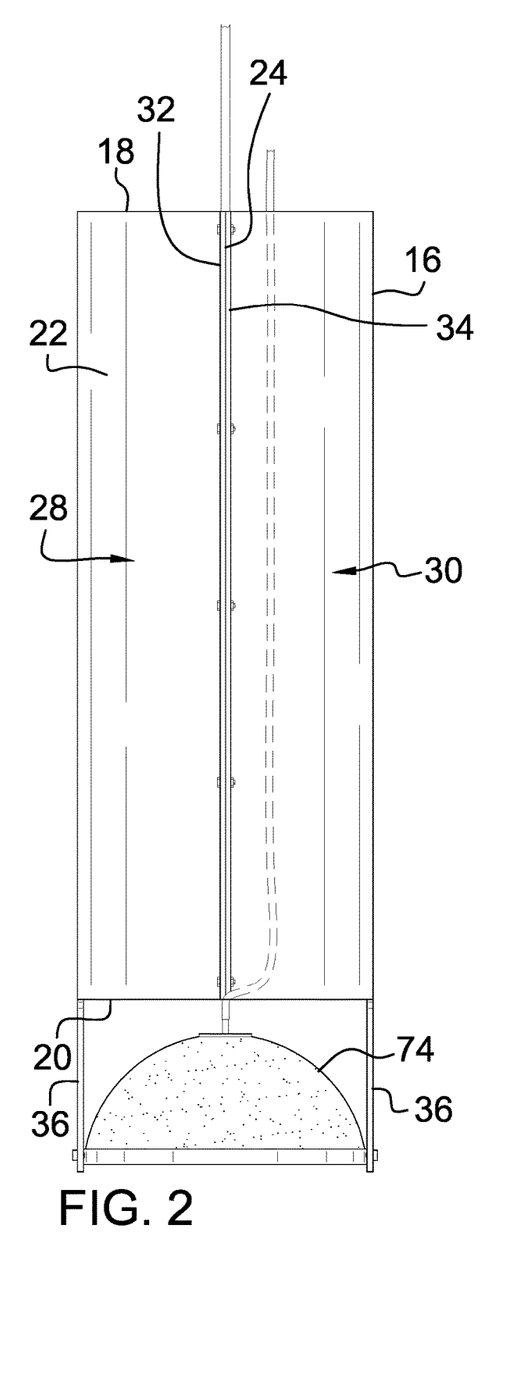
FIG. 2 is a front view of a cylinder of an embodiment of the disclosure.
Figure 3:
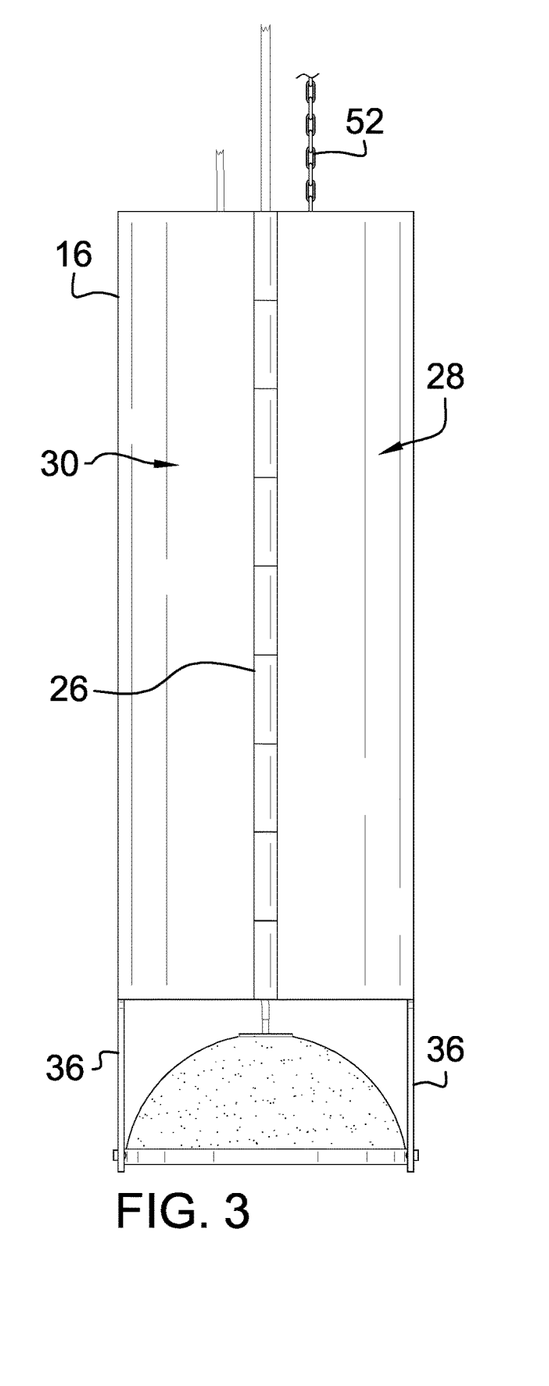
FIG. 3 is a back view of a cylinder of an embodiment of the disclosure.
Figure 4:
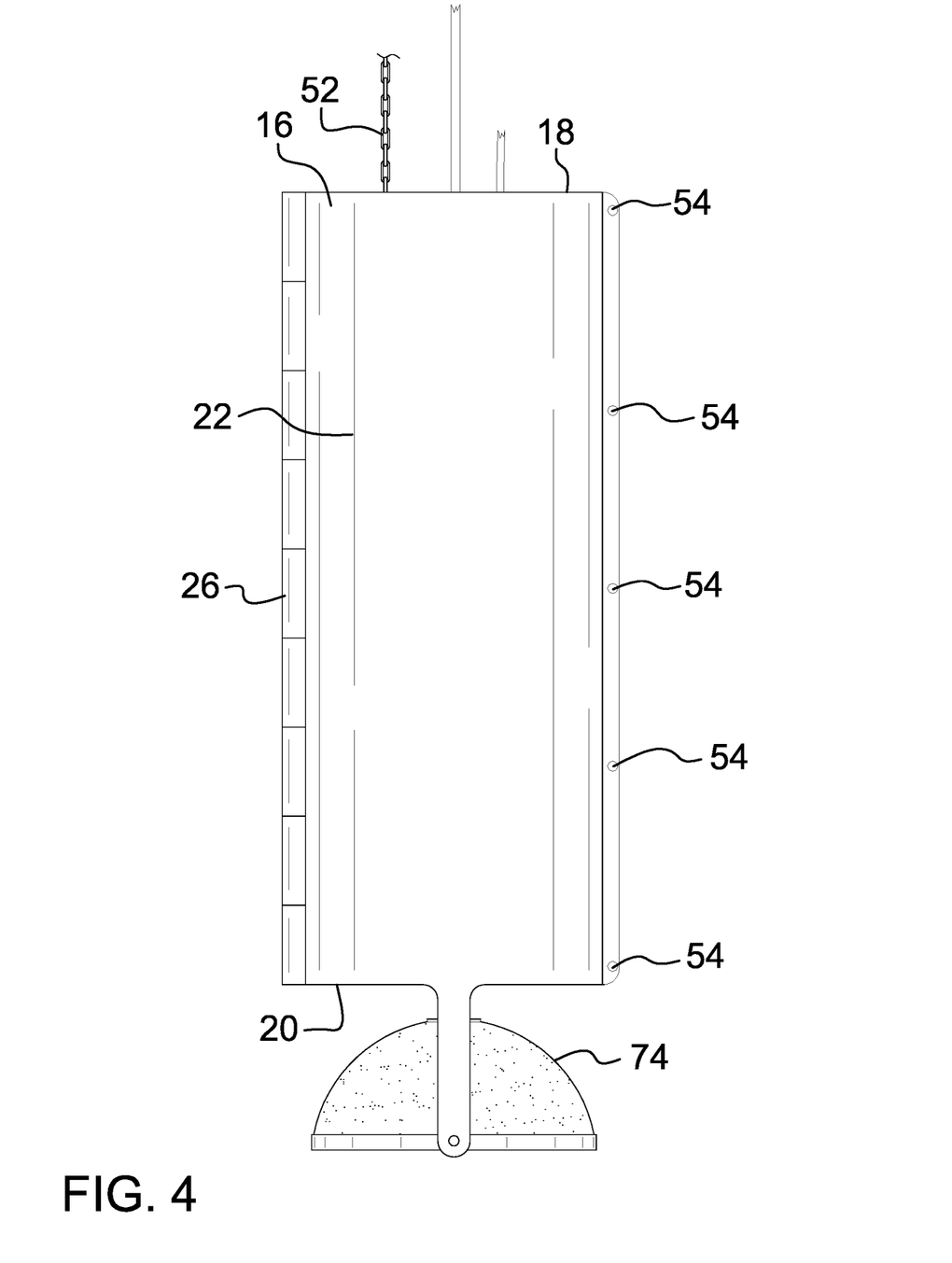
FIG. 4 is a right side view of a cylinder of an embodiment of the disclosure.
Figure 5:
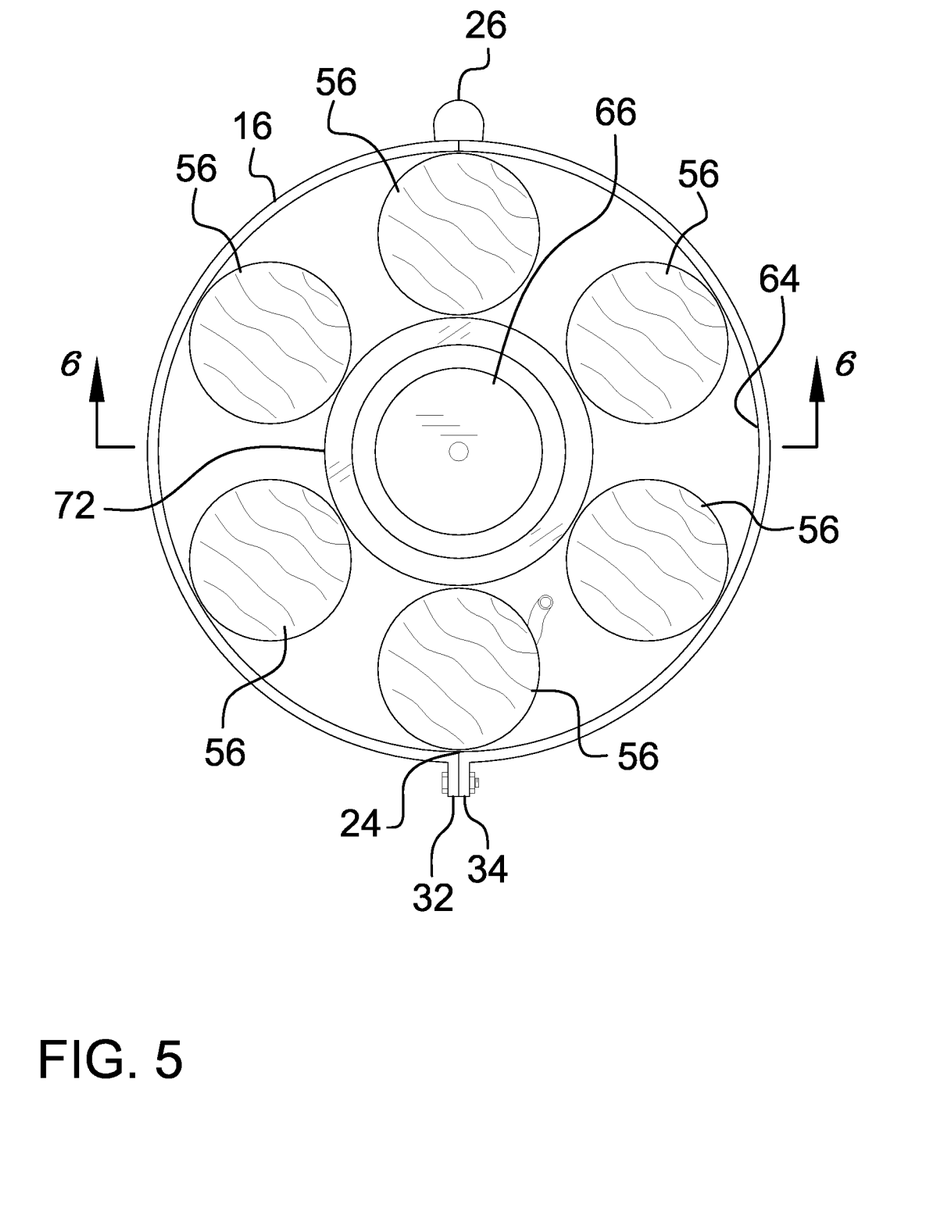
FIG. 5 is a top view of a cylinder of an embodiment of the disclosure.
Figure 6:
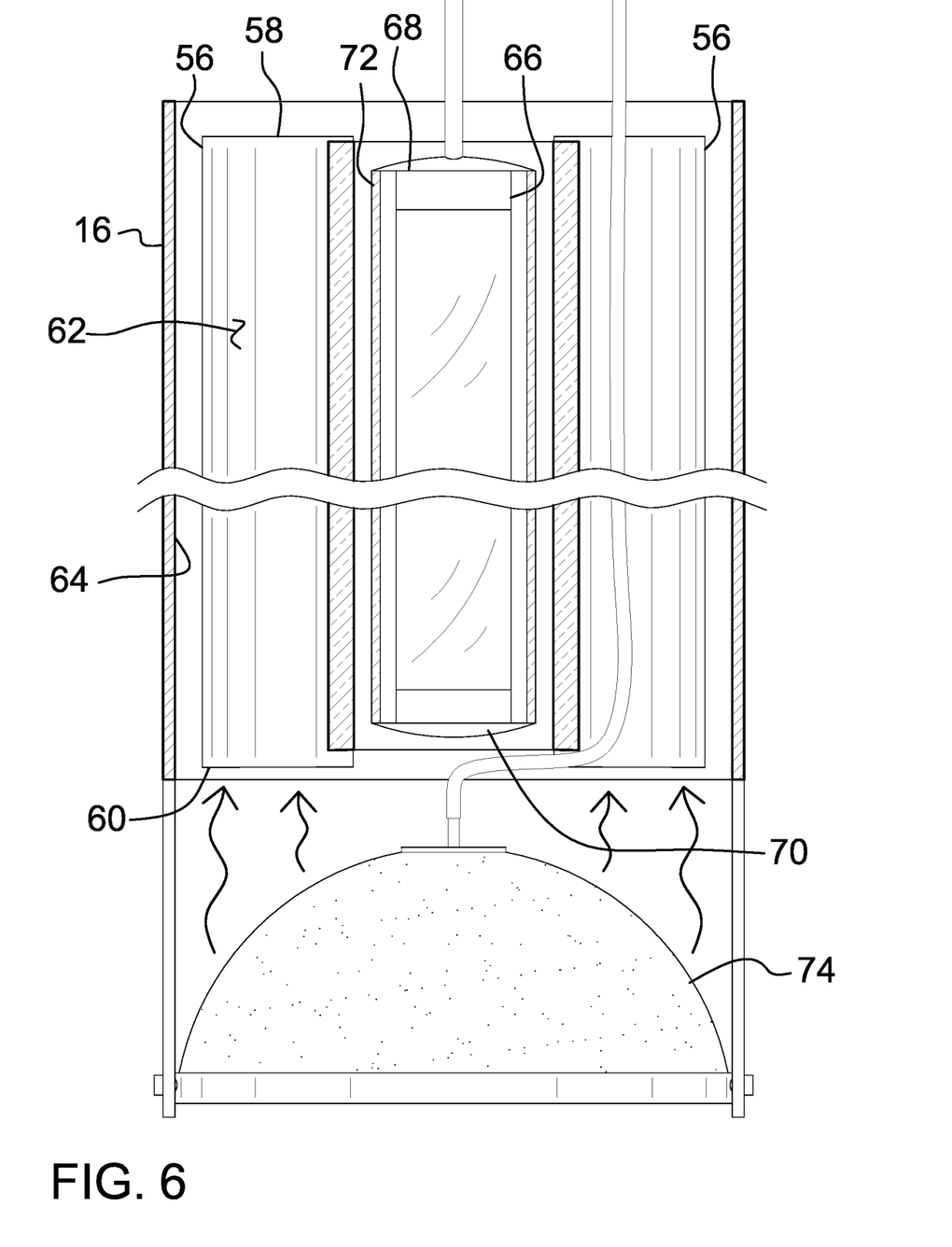
FIG. 6 is a cross sectional view taken along line 6-6 of FIG. 5 of an embodiment of the disclosure.

With reference now to the drawings, and in particular to FIGS. 1 through 6 thereof, a new aging device embodying the principles and concepts of an embodiment of the disclosure and generally designated by the reference numeral 10 will be described.

As best illustrated in FIGS. 1 through 6, the alcohol aging assembly 10 generally comprises an aging container 12 which can contain alcohol 14. The alcohol 14 may be a distilled spirit, such as whiskey, rum or other distilled spirit that is intended for human consumption. A cylinder 16 is provided which is comprised of copper thereby facilitating the cylinder 16 to be submerged in alcohol 14 without imparting an unpleasant flavor to the alcohol 14. The cylinder 16 is insertable into the aging container 12, and the cylinder 16 has a top end 18, a bottom end 20 and an outer wall 22 extending between the top end 18 and the bottom end 20 of the cylinder 16.

The outer wall 22 has a cut 24 extending between the top end 18 and the bottom end 20 of the cylinder 16. The outer wall 22 has a hinge 26 extending between the top end 18 and the bottom end 20 of the cylinder 16 to define a first half 28 of the cylinder 16 is hingedly coupled to a second half 30 of the cylinder 16. The hinge 26 is positioned on an opposite side of the outer wall 22 with respect to the cut 24. The outer wall 22 has a first lip 32 extending outwardly from the outer wall 22 and the first lip 32 is coextensive with the cut. The outer wall 22 has a second lip 34 extending outwardly from the outer wall 22 and the second lip 34 is coextensive with the cut. The first lip 32 abuts the second lip 34 when the cylinder 16 is positioned in a closed position, and the first lip 32 is displaced from the second lip 34 when the cylinder 16 is positioned in an open position.

The cylinder 16 has a diameter that is less than a diameter of the aging container 12. Additionally, the cylinder 16 has a height is less than a height of the aging container 12. The bottom end 20 of the cylinder 16 has a pair of tabs 36 each extending downwardly from the bottom end of the cylinder 16, and the tabs 36 are positioned on opposite sides of the outer wall 22 of the cylinder 16. The aging container 12 may be a glass cylinder or other type of fluid impermeable container that is comprised of an inert material.

A first stopper 38 is insertable into the aging container 12 when the cylinder 16 is positioned in the aging container 12. The first stopper 38 frictionally engages the aging container 12 such that the first stopper 38 closes the aging container 12 when the first stopper 38 is inserted into the aging container 12. The first stopper 38 has an upper end 40, a lower end 42 and an outside surface 44 extending between the upper end 40 and the lower end 42. The outside surface 44 angles inwardly between the upper end 40 and the lower end 42 such that the upper end 40 has a diameter that is greater than a diameter of the lower end 42. The outside surface 44 frictionally engages an interior surface 46 of the aging container 12 when the first stopper 38 is inserted into the top end 18 of the aging container 12 for closing the aging container 12. The first stopper 38 has a hole 48 extending through the upper end 40 and the lower end 42 of the first stopper 38.

A first conduit 50 is provided and the first conduit 50 extends through the hole 48 in the first stopper 38. A chain 52 is coupled between the first stopper 38 and the cylinder 16 such that the cylinder 16 is suspended from the first stopper 38 when the cylinder 16 and the first stopper 38 are inserted into the aging container 12. Moreover, the chain 52 is comprised of copper thereby facilitating the chain 52 to be submerged in the alcohol 14 without imparting an unpleasant flavor into the alcohol 14. The chain 52 extends between the lower end 42 of the first stopper 38 and the top end 18 of the cylinder 16.

A plurality of fasteners 54 is provided and each of the fasteners 54 is extendable through the first lip 32 to engage the second lip 34 for retaining the cylinder 16 in the closed position. A plurality of dowels 56 is provided and each of the dowels 56 is disposed within the cylinder 16. In this way each of the dowels 56 is submerged in the alcohol 14 when the cylinder 16 is submerged in the alcohol 14. Each of the dowels 56 is comprised of oak such that each of the dowels 56 facilitates a chemical process to enhance the flavor and color of the alcohol 14. Each of the dowels 56 has an upper end 58, a lower end 60 and an outer surface 62 extending between the upper end 58 and the lower end 60. Each of the dowels 56 is oriented in the cylinder 16 such that the upper end 58 is positioned adjacent to the top end 18 and the lower end 60 is positioned adjacent to the bottom end 20 having the outer surface 62 abutting an inside surface 64 of the outer wall 22 of the cylinder 16. The dowels 56 are spaced apart from each other and are distributed around a full circumference of the outer wall 22.

A light emitter 66 is disposed inside of the cylinder 16 such that the light emitter 66 emits light into the alcohol 14 when the cylinder 16 is submerged into the alcohol 14. The light emitter 66 emits light in the ultra-violet spectrum. In this way the energy in the ultra-violet light increases the rate of chemical reaction between the alcohol 14 and the dowels 56 thereby speeding up the process of aging the alcohol 14. The light emitter 66 has a topmost end 68 and a lowermost end 70, and the light emitter 66 is elongated between the topmost end 68 and the lowermost end 70. Furthermore, the light emitter 66 is centrally positioned in the cylinder 16 such that the plurality of dowels 56 surrounds the light emitter 66.

A tube 72 is provided and the tube 72 is positioned around the light emitter 66. The tube 72 is comprised of a translucent material to pass light through the tube 72. The tube 72 extends along a full length of the light emitter 66 and the tube 72 abuts the outer surface 62 of each of the dowels 56. Moreover, the tube 72 is comprised of a compressible material thereby inhibiting the light emitter 66 from being damaged by the dowels 56.

An aerator 74 is disposed on the cylinder 16 such that the aerator 74 is submerged in the alcohol 14 when the cylinder 16 is submerged in the alcohol 14. The aerator 74 is pivotally coupled to each of the tabs 36 extending downwardly from the bottom end 20 of the cylinder 16. The aerator 74 may comprise a porous stone, for example, or other type of aerator 74 that might commonly be employed in an aquarium, for example. A fluid pump 76 is provided which can be submerged in the alcohol 14. The fluid pump 76 has an inlet 78 and an output 80 and the fluid pump 76 urges the alcohol 14 inwardly through the inlet 78 and outwardly through the output 80 when the fluid pump 76 is turned on to circulate the alcohol 14. The fluid pump 76 may comprise an electric fluid pump or the like.

A control unit 82 is provided and the control unit 82 is in communication with the light emitter 66 and the fluid pump 76 for controlling the light emitter 66 and the fluid pump 76. The control unit 82 has a plurality of power buttons 84 that is each movably disposed on the control unit 82. Each of the power buttons 84 is electrically coupled to a respective one of the light emitter 66 and the fluid pump 76 for turning the light emitter 66 and the fluid pump 76 on and off. A power supply 86 is integrated into the control unit 82 and the power supply 86 is electrically coupled to each of the power buttons 84. The power supply 86 includes a master power cord 88 extending away from the control unit 82. The master power cord 88 has a distal end 90 with respect to the control unit 82, and a male plug 92 is electrically coupled to the distal end 90 such that the male plug 92 can be plugged into a power source 94 comprising a female electrical plug.

An air pump 96 is integrated into the control unit 82 and the air pump 96 is in communication with the aerator 74. In this way the air pump 96 can urge air through the aerator 74 for aerating the alcohol 14 when the aerator 74 is submerged in the alcohol 14. In this way the aerator 74 increases the oxygen content of the alcohol 14 to speed up the oxidation process that is involved with aging alcohol 14. The air pump 96 has an exhaust port 98 which is integrated into the air pump 96 and the air pump 96 urges air outwardly through the exhaust port 98 when the air pump 96 is turned on. Additionally, the air pump 96 is electrically coupled to a respective one of the power buttons 84 on the control unit 82 for turning the air pump 96 on and off.

An air tube 100 is fluidly coupled between the exhaust port 98 on the air pump 96 and the aerator 74 to deliver air to the aerator 74. The air tube 100 extends through the upper end 40 and the lower end 42 of the first stopper 38. A first power cord 102 is electrically coupled between a respective one of the power buttons 84 and the fluid pump 76, and the first power cord 102 extends through the upper end 40 and the lower end 42 of the first stopper 38. A reclamation container 104 is provided that has a top end 106 and the top end 106 of the reclamation container 104 is open.

A second stopper 108 is provided which has an upper end 110, a lower end 112 and an outside surface 114 extending between the upper end 110 and the lower end 112 of the second stopper 108. The second stopper 108 is insertable into the top end 106 of the reclamation container 104 having the outside surface 114 frictionally engaging an outer wall 115 of the reclamation container 104 for closing the reclamation container 104. The second stopper 108 has a first aperture 116 extending through the upper end 110 and the lower end 112 of the second stopper 108. The second stopper 108 has a second aperture 117 extending through the upper end 110 and the lower end 112 of the second stopper 108.

A second conduit 118 is provided and the second conduit 118 extends through the first aperture 116 in the second stopper 108. A third conduit 120 extends through the second aperture 117 in the second stopper 108. A vapor tube 122 is fluidly coupled between the first conduit 50 and the second conduit 118 to facilitate evaporated alcohol 14 to be transported into the reclamation container 104. In this way the evaporated alcohol 14 condenses in the reclamation container 104. The third conduit 120 is in fluid communication with an interior of the reclamation container 104 to ventilate the reclamation container 104.

In use, the fluid pump 76 is positioned in the aging container 12 and the aging container 12 is filled with alcohol 14. The cylinder 16 is submerged in the alcohol 14 in the aging container 12 and the first stopper 38 is inserted into the top end 18 of the aging container 12 to suspend the cylinder 16 in the alcohol 14. Each of the power buttons 84 is turned on to actuate the light emitter 66, the air pump 96 and the fluid pump 76. In this way the alcohol 14 is oxygenated, the oak dowels 56 impart the desired qualities into the alcohol 14 and the light emitter 66 emits the ultra-violet light into the alcohol 14. Thus, the aging process of the alcohol 14 is accomplished in significantly less time as compared to the traditional process of aging distilled spirits in oak barrels. Additionally, the vapor tube 122 is coupled between the first conduit 50 and the second conduit 118 to facilitate the evaporated alcohol 14 to be condensed and reclaimed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. An alcohol aging assembly for rapidly aging alcohol, said assembly comprising:
   an aging container being configured to contain alcohol;
   a cylinder being comprised of copper wherein said cylinder is configured to be submerged in the alcohol without imparting an unpleasant flavor to the alcohol, said cylinder being insertable into said aging container;
   a plurality of dowels, each of said dowels being disposed within said cylinder wherein each of said dowels is configured to be submerged in the alcohol when said cylinder is submerged in the alcohol, each of said dowels being comprised of oak wherein each of said dowels is configured to facilitate a chemical process to enhance the flavor and color of the alcohol; and
   a light emitter being disposed inside of said cylinder wherein said light emitter is configured to emit light into the alcohol when said cylinder is submerged into the alcohol, said light emitter emitting light in the ultra-violet spectrum wherein said light emitter is configured to increase the rate of chemical reaction between the alcohol and said dowels thereby speeding up the process of aging the alcohol;
   wherein:
   said cylinder has a top end, a bottom end and an outer wall extending between said top end and said bottom end of said cylinder, said outer wall having a cut extending between said top end and said bottom end of said cylinder, said outer wall having a hinge extending between said top end and said bottom end of said cylinder to define a first half of said cylinder being hingedly coupled to a second half of said cylinder, said hinge being positioned on an opposite side of said outer wall with respect to said cut;
   said outer wall has a first lip extending outwardly from said outer wall, said first lip being coextensive with said cut;
   said outer wall has a second lip extending outwardly from said outer wall, said second lip being coextensive with said cut, said first lip abutting said second lip when said cylinder is positioned in a closed position, said first lip being displaced from said second lip when said cylinder is positioned in an open position;
   said cylinder has a diameter being less than a diameter of said aging container, said cylinder having a height being less than a height of said aging container; and
   said bottom end of said cylinder has a pair of tabs each extending downwardly from said bottom end of said cylinder, said tabs being positioned on opposite sides of said outer wall of said cylinder;
   an aerator being disposed on said cylinder wherein said aerator is configured to be submerged in the alcohol, said aerator being pivotally coupled to each of said tabs extending downwardly from said bottom end of said cylinder; and
   a fluid pump being configured to be submerged in the alcohol, said fluid pump having an inlet and an output wherein said fluid pump is configured to urge the alcohol inwardly through said inlet and outwardly through said output when said fluid pump is turned on to circulate the alcohol.

2. The assembly according to claim 1, wherein:
said aging container has a bottom end and a top end, said top end being open; and
said assembly includes a first stopper being insertable into said aging container when said cylinder is positioned in said aging container, said first stopper frictionally engaging said aging container such that said first stopper closes said aging container when said first stopper is inserted into said aging container, said first stopper having an upper end, a lower end and an outside surface extending between said upper end and said lower end, said outside surface angling inwardly between said upper end and said lower end such that said upper end has a diameter being greater than a diameter of said lower end, said outside surface frictionally engaging an interior surface of said aging container when said first stopper is inserted into said top end of said aging container for closing said aging container, said first stopper having a hole extending through said upper end and said lower end of said first stopper.

3. The assembly according to claim 2, further comprising:
said assembly includes a first conduit extending through said hole in said first stopper; and
a chain being coupled between said first stopper and said cylinder such that said cylinder is suspended from said first stopper when said cylinder and said first stopper are inserted into said aging container, said chain being comprised of copper wherein said chain is configured to be submerged in the alcohol without imparting an unpleasant flavor into the alcohol, said chain extending between said lower end of said first stopper and a top end of said cylinder.

4. The assembly according to claim 1, wherein each of said dowels has an upper end, a lower end and an outer surface extending between said upper end and said lower end, each of said dowels being oriented in said cylinder such that said upper end is positioned adjacent to said top end and said lower end is positioned adjacent to said bottom end having said outer surface abutting an inside surface of said outer wall of said cylinder, said dowels being spaced apart from each other and being distributed around a full circumference of said outer wall.

5. The assembly according to claim 4, wherein:
said light emitter has a topmost end and a lowermost end, said light emitter being elongated between said topmost end and said lowermost end, said light emitter being centrally positioned in said cylinder such that said plurality of dowels surrounds said light emitter; and
said assembly includes a tube being positioned around said light emitter, said tube being comprised of a translucent material wherein said tube is configured to pass light through said tube, said tube extending along a full length of said light emitter, said tube abutting said outer surface of each of said dowels, said tube being comprised of a compressible material thereby inhibiting said light emitter from being damaged by said dowels.

6. The assembly according to claim 1, further comprising a control unit being in communication with said light emitter and said fluid pump for controlling said light emitter and said fluid pump, said control unit having a plurality of power buttons each being movably disposed on said control unit, each of said power buttons being electrically coupled to a respective one of said light emitter and said fluid pump for turning said light emitter and said fluid pump on and off.

7. The assembly according to claim 6, further comprising an air pump being integrated into said control unit, said air pump being in communication with said aerator wherein said air pump is configured to urge air through said aerator for aerating the alcohol when said aerator is submerged in the alcohol, said air pump having an exhaust port being integrated into said air pump wherein said air pump is configured to urge air outwardly through said exhaust port when said air pump is turned on, said air pump being electrically coupled to a respective one of said power buttons on said control unit for turning said air pump on and off.

8. The assembly according to claim 7, further comprising:
a first stopper having an upper end and a lower end; and
an air tube being fluidly coupled between said exhaust port on said air pump and said aerator wherein said air tube is configured to deliver air to said aerator said air tube extending through said upper end and said lower end of said first stopper.

9. The assembly according to claim 1, further comprising:
a reclamation container having a top end, said top end of said reclamation container being open;
a first stopper;
a second stopper having an upper end, a lower end and an outside surface extending between said upper end and said lower end of said second stopper, said second stopper being insertable into said top end of said reclamation container having said outside surface frictionally engaging an outer wall of said reclamation container for closing said reclamation container, said second stopper having a first aperture extending through said upper end and said lower end of said second stopper, said second stopper having a second aperture extending through said upper end and said lower end of said second stopper.

10. The assembly according to claim 9, further comprising:
a first conduit;
a second conduit extending through said first aperture in said second stopper;
a third conduit extending through said second aperture in said second stopper; and
a vapor tube being fluidly coupled between said first conduit and said second conduit wherein said vapor tube is configured to facilitate evaporated alcohol to be transported into said reclamation container such that the evaporated alcohol condenses in said reclamation container, said third conduit being in fluid communication with an interior of said reclamation container wherein said third conduit is configured to ventilate said reclamation container.

11. An alcohol aging assembly for rapidly aging alcohol, said assembly comprising:
an aging container being configured to contain alcohol;
a cylinder being comprised of copper wherein said cylinder is configured to be submerged in the alcohol without imparting an unpleasant flavor to the alcohol, said cylinder being insertable into said aging container, said cylinder having a top end, a bottom end and an outer wall extending between said top end and said bottom end of said cylinder, said outer wall having a cut extending between said top end and said bottom end of said cylinder, said outer wall having a hinge extending between said top end and said bottom end of said cylinder to define a first half of said cylinder being hingedly coupled to a second half of said cylinder, said hinge being positioned on an opposite side of said outer wall with respect to said cut, said outer wall having a first lip extending outwardly from said outer wall, said first lip being coextensive with said cut, said outer wall having a second lip extending outwardly from said outer wall, said second lip being coextensive with said cut, said first lip abutting said second lip when said cylinder is positioned in a closed position, said first lip being displaced from said second lip when said cylinder is positioned in an open position, said cylinder having a diameter being less than a diameter of said aging container, said cylinder having a height being less than a height of said aging container, said bottom end of said cylinder having a pair of tabs each extending downwardly from said bottom end of said cylinder, said tabs being positioned on opposite sides of said outer wall of said cylinder;

a first stopper being insertable into said aging container when said cylinder is positioned in said aging container, said first stopper frictionally engaging said aging container such that said first stopper closes said aging container when said first stopper is inserted into said aging container, said first stopper having an upper end, a lower end and an outside surface extending between said upper end and said lower end, said outside surface angling inwardly between said upper end and said lower end such that said upper end has a diameter being greater than a diameter of said lower end, said outside surface frictionally engaging an interior surface of said aging container when said first stopper is inserted into said top end of said aging container for closing said aging container, said first stopper having a hole extending through said upper end and said lower end of said first stopper;

a first conduit extending through said hole in said first stopper;

a chain being coupled between said first stopper and said cylinder such that said cylinder is suspended from said first stopper when said cylinder and said first stopper are inserted into said aging container, said chain being comprised of copper wherein said chain is configured to be submerged in the alcohol without imparting an unpleasant flavor into the alcohol, said chain extending between said lower end of said first stopper and said top end of said cylinder;

a plurality of fasteners, each of said fasteners being extendable through said first lip to engage said second lip for retaining said cylinder in said closed position;

a plurality of dowels, each of said dowels being disposed within said cylinder wherein each of said dowels is configured to be submerged in the alcohol when said cylinder is submerged in the alcohol, each of said dowels being comprised of oak wherein each of said dowels is configured to facilitate a chemical process to enhance the flavor and color of the alcohol, each of said dowels having an upper end, a lower end and an outer surface extending between said upper end and said lower end, each of said dowels being oriented in said cylinder such that said upper end is positioned adjacent to said top end and said lower end is positioned adjacent to said bottom end having said outer surface abutting an inside surface of said outer wall of said cylinder, said dowels being spaced apart from each other and being distributed around a full circumference of said outer wall;

a light emitter being disposed inside of said cylinder wherein said light emitter is configured to emit light into the alcohol when said cylinder is submerged into the alcohol, said light emitter emitting light in the ultra-violet spectrum wherein said light emitter is configured to increase the rate of chemical reaction between the alcohol and said dowels thereby speeding up the process of aging the alcohol, said light emitter having a topmost end and a lowermost end, said light emitter being elongated between said topmost end and said lowermost end, said light emitter being centrally positioned in said cylinder such that said plurality of dowels surrounds said light emitter;

a tube being positioned around said light emitter, said tube being comprised of a translucent material wherein said tube is configured to pass light through said tube, said tube extending along a full length of said light emitter, said tube abutting said outer surface of each of said dowels, said tube being comprised of a compressible material thereby inhibiting said light emitter from being damaged by said dowels;

an aerator being disposed on said cylinder wherein said aerator is configured to be submerged in the alcohol, said aerator being pivotally coupled to each of said tabs extending downwardly from said bottom end of said cylinder;

a fluid pump being configured to be submerged in the alcohol, said fluid pump having an inlet and an output wherein said fluid pump is configured to urge the alcohol inwardly through said inlet and outwardly through said output when said fluid pump is turned on to circulate the alcohol;

a control unit being in communication with said light emitter and said fluid pump for controlling said light emitter and said fluid pump, said control unit having a plurality of power buttons each being movably disposed on said control unit, each of said power buttons being electrically coupled to a respective one of said light emitter and said fluid pump for turning said light emitter and said fluid pump on and off;

a power supply being integrated into said control unit, said power supply being electrically coupled to each of said power buttons, said power supply including a master power cord extending away from said control unit, said master power cord having a distal end with respect to said control unit, said distal end having a male plug being electrically coupled to said distal end wherein said male plug is configured to be plugged into a power source comprising a female electrical plug;

an air pump being integrated into said control unit, said air pump being in communication with said aerator wherein said air pump is configured to urge air through said aerator for aerating the alcohol when said aerator is submerged in the alcohol, said air pump having an exhaust port being integrated into said air pump wherein said air pump is configured to urge air outwardly through said exhaust port when said air pump is turned on, said air pump being electrically coupled to a respective one of said power buttons on said control unit for turning said air pump on and off;

an air tube being fluidly coupled between said exhaust port on said air pump and said aerator wherein said air tube is configured to deliver air to said aerator, said air tube extending through said upper end and said lower end of said first stopper;

first power cord being electrically coupled between a respective one of said power buttons and said fluid pump, said first power cord extending through said upper end and said lower end of said first stopper;

a reclamation container having a top end, said top end of said reclamation container being open;

a second stopper having an upper end, a lower end and an outside surface extending between said upper end and said lower end of said second stopper, said second stopper being insertable into said top end of said reclamation container having said outside surface frictionally engaging an outer wall of said reclamation container for closing said reclamation container, said second stopper having a first aperture extending through said upper end and said lower end of said second stopper, said second stopper having a second aperture extending through said upper end and said lower end of said second stopper;

a second conduit extending through said first aperture in said second stopper;

a third conduit extending through said second aperture in said second stopper; and a vapor tube being fluidly coupled between said first conduit and said second conduit wherein said vapor tube is configured to facilitate evaporated alcohol to be transported into said reclamation container such that the evaporated alcohol condenses in said reclamation container, said third conduit being in fluid communication with an interior of said reclamation container wherein said third conduit is configured to ventilate said reclamation container.

* * * * *